United States Patent
Marino et al.

(10) Patent No.: US 11,086,488 B1
(45) Date of Patent: Aug. 10, 2021

(54) MODIFYING PRESENTATION OF CONTENT ITEMS ON A PAGE OF CONTENT MAINTAINED BY AN ONLINE SYSTEM IN RESPONSE TO USER INTERACTIONS WITH CONTENT VIA A THIRD PARTY SYSTEM

(71) Applicant: Facebook, Inc., Menlo Park, CA (US)

(72) Inventors: Addie Louise Marino, Brooklyn, NY (US); Keenan Christopher Pridmore, Wilmette, IL (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 16/997,143

(22) Filed: Aug. 19, 2020

Related U.S. Application Data (60) Provisional application No. 62/889,467, filed on Aug. 20, 2019.

(51) Int. Cl.
*G06F 3/0482* (2013.01)
*G06F 16/9535* (2019.01)
*G06F 16/955* (2019.01)

(52) U.S. Cl.
CPC ........ *G06F 3/0482* (2013.01); *G06F 16/9535* (2019.01); *G06F 16/9558* (2019.01)

(58) Field of Classification Search
CPC .................................................. G06F 3/0482
USPC ......................................................... 715/739
See application file for complete search history.

(56) References Cited

U.S. PATENT DOCUMENTS

| | | | |
|---|---|---|---|
| 8,949,250 B1* | 2/2015 | Garg | G06Q 50/01 707/748 |
| 9,239,663 B1* | 1/2016 | Dishlip | G06F 3/04812 |
| 10,410,234 B1* | 9/2019 | Madden | G06Q 30/0224 |
| 10,489,387 B1* | 11/2019 | Rogynskyy | H04L 43/0876 |
| 10,872,118 B2* | 12/2020 | Larusson | G06F 16/24578 |
| 2004/0002355 A1* | 1/2004 | Spencer, II | H04L 69/329 455/550.1 |
| 2008/0009325 A1* | 1/2008 | Zinn | H04M 1/72469 455/566 |
| 2009/0007020 A1* | 1/2009 | Suzuki | G06F 3/04886 715/841 |
| 2010/0169813 A1* | 7/2010 | Chang | G06F 3/0488 715/767 |
| 2010/0318571 A1* | 12/2010 | Pearlman | H04L 67/306 707/784 |
| 2011/0154224 A1* | 6/2011 | Bates | G06Q 10/10 715/758 |

(Continued)

*Primary Examiner* — Reza Nabi
(74) *Attorney, Agent, or Firm* — Fenwick & West LLP (57) ABSTRACT

An online system provides a user-generated media platform that enables the gamification of content generated on the site. The online system maintains a page of content including content items and a link to a third party system that is external to the online system. When the user selects the link, the user is directed to the third party system with which the user interacts to complete tasks. When the third party system determines one or more conditions are satisfied based on the user interactions with content from the third party system, the third party system updates the page of content maintained by the online system. For example, the third party system provides additional content items to the online system for display via the page of content or unlocks content items stored by the online system for presentation by the page of content.

14 Claims, 3 Drawing Sheets

(56) References Cited

U.S. PATENT DOCUMENTS

| | | | |
|---|---|---|---|
| 2012/0166532 A1* | 6/2012 | Juan | G06Q 50/01 |
| | | | 709/204 |
| 2013/0124298 A1* | 5/2013 | Li | G06Q 30/0241 |
| | | | 705/14.42 |
| 2014/0019261 A1* | 1/2014 | Hegeman | G06Q 30/02 |
| | | | 705/14.71 |
| 2014/0075463 A1* | 3/2014 | Kamdar | H04N 21/25891 |
| | | | 725/9 |
| 2014/0156360 A1* | 6/2014 | Shalita | G06Q 30/0255 |
| | | | 705/14.1 |
| 2014/0156566 A1* | 6/2014 | Kabiljo | G06N 20/00 |
| | | | 706/12 |
| 2014/0156744 A1* | 6/2014 | Hua | H04L 65/403 |
| | | | 709/204 |
| 2015/0089371 A1* | 3/2015 | Zaslavsky | G06F 3/0482 |
| | | | 715/716 |
| 2015/0113060 A1* | 4/2015 | Wahi | H04L 65/403 |
| | | | 709/204 |
| 2015/0142507 A1* | 5/2015 | Osman | G06Q 10/06 |
| | | | 705/7.28 |
| 2016/0117407 A1* | 4/2016 | Cypher | G06Q 30/0261 |
| | | | 235/375 |
| 2018/0039408 A1* | 2/2018 | Cheong | G06F 3/04886 |
| 2018/0082331 A1* | 3/2018 | Feldman | G06Q 30/0273 |
| 2018/0220015 A1* | 8/2018 | Akuzawa | H04N 1/00517 |
| 2019/0095961 A1* | 3/2019 | Wu | G06Q 30/0255 |
| 2019/0279260 A1* | 9/2019 | Carpita | G06F 16/638 |
| 2020/0027033 A1* | 1/2020 | Garg | H04L 67/34 |
| 2020/0142930 A1* | 5/2020 | Wang | G06K 9/6223 |

\* cited by examiner

MODIFYING PRESENTATION OF CONTENT ITEMS ON A PAGE OF CONTENT MAINTAINED BY AN ONLINE SYSTEM IN RESPONSE TO USER INTERACTIONS WITH CONTENT VIA A THIRD PARTY SYSTEM

CROSS-REFERENCE TO RELATED APPLICATIONS

This application claims the benefit of U.S. Provisional Application No. 62/889,467, filed Aug. 20, 2019, which is incorporated by reference in its entirety.

BACKGROUND

This disclosure relates generally to display of content to users of an online system, and more specifically to modifying content presented by the online system to a user based on the user's interactions with content provided by a third party system external to the online system.

Online systems, such as social networking systems, allow users to connect to and to communicate with other users of the online system. Users may create profiles on an online system that are tied to their identities and include information about the users, such as interests and demographic information. The users may be individuals or entities such as corporations or charities. Online systems allow users to easily communicate and to share content with other online system users by providing content to an online system for presentation to other users.

SUMMARY

An online system generates a feed of content for a viewing user that displays content items provided to the online system for presentation. The online system obtains content items from various users and generates the feed of content for the viewing user from content items obtained from other users connected to the viewing user via the online system. Additionally, the online system maintains pages of content that each include one or more content items for presentation to users of the online system. A page of content is associated with a user and includes content items the online system obtained from the user. In some embodiments, the user associated with a page of content is a third party system that is in a domain different than a domain of the online system (i.e., a third party system "external to" the online system) or is associated with the third party system external to the online system.

The page of content includes a link to the third party system that, when selected or accessed by the viewing user, obtains content from the third party system. In some embodiments, when the viewing user selects the link to the third party system, the online system requests content from the third party system, and a client device associated with the viewing user that is presenting the page of content retrieves content from the third party system and displays the content from the third party system. The user interacts with the content from the third party system via the client device, and the third party system receives the interactions by the viewing user with the content from the third party system. In various embodiments, interactions by the user with the content from the third party system correspond to tasks maintained by the third party system. A task corresponds to performance of one or more particular interactions with the content maintained by third party system, allowing the third party system to maintain specific interactions or combinations of interactions for users to perform with the content maintained by the third party system.

The third party system determines whether interactions by the viewing user with the content satisfy one or more conditions. In some embodiments, the third party system stores interactions by the viewing user with the content maintained by the third party system in association with an identifier of the viewing user. The identifier of the viewing user may be received from the online system when the viewing user selects the link to the third party system included in the page of content, and may be an identifier used by the online system to identify the user. In some embodiments, the third party system determines whether a total number of interactions by the viewing user meet or exceed a threshold number of interactions. As another example, the third party system determines whether stored interactions by the viewing user with the content maintained by the third party system correspond to completion of at least a threshold number of tasks maintained by the third party system. In other embodiments, the third party system compares a total number of interactions with content maintained by the third party system by multiple users to the one or more conditions and determines whether the total number of interactions by multiple users satisfy one or more of the conditions.

In response to determining that interactions with the content maintained by the third party system satisfy one or more of the conditions, the third party system provides additional content items to the online system for display via the page of content. For example, the third party system transmits additional content items to the online system, which displays the additional content items on the page of content in conjunction with content items already included on the page of content. In another example, the third party system transmits a message to the online system identifying content items the online system previously received from the third party system, and the online system subsequently displays the content items identified by the message in response to receiving the message. The online system may limit display of the additional content items via the page of content to the viewing user who performed interactions with the content maintained by the third party system that satisfied one or more conditions. Alternatively, the online system displays the additional content items via the page of content to users who access the page of content after the third party system determines that interactions by multiple users with the content maintained by the third party system satisfy the one or more conditions. This allows the third party system to condition display of additional content items to users on user interactions with the content maintained by the third party system satisfying one or more conditions, enticing users to interact with the content maintained by the third party system to be presented with additional content items via the page of content maintained by the online system.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Overview

A third party system that is external to an online system may use the online system to present content to users of the online system, enticing users of the online system to access or to interact with content provided by the third party system. For example, a third party system generates a page of content that is displayed by the online system, with the page of content including content items describing different content offered by the third party system and including links for accessing different content offered by the third party system via the third party system. For example, a content item included on the page of content includes an image or text describing content maintained by the third party system as well as a link that, when accessed, accesses the third party system to retrieve the content described by the content item.

However, conventional online systems display content items on a page of content maintained for a third party system based on receipt of content items from the third party system, which does not allow the online system to modify content items presented to a user based on how the user interacted with content via the third party system. For example, conventional online systems display content items via a page maintained for a third party system in a sequence or order specified by the third party system to multiple users accessing the page, regardless of how different users have interacted with content provided by the third party system. This can decrease a likelihood of users interacting with content provided by the third party system after viewing the page maintained by the online system for the third party system. To maintain user interaction with content provided by the third party system, the online system modifies content presented on the page maintained for the third party system to a user based on interactions by the user with content provided by the third party system. As further described below in conjunction with FIGS. 2-4, when a user accesses content provided by the third party system via a link to the content included in a content item of the page maintained for the third party system by the online system, the third party system compares interactions by the user with the content provided by the third party system. When interactions by the user with the content provided by the third party system satisfy one or more conditions maintained by the third party system, the third party system transmits a notification to the online system identifying the user and requesting the online system modify presentation of the page of content maintained for the third party system to the user. This allows the third party system to modify content items that the online system presents to the user via the page of content maintained for the third party system when the user's interactions with content presented by the third party system satisfy various conditions. For example, the third party system transmits a message to the online system when a user's interactions with content presented by the third party system satisfy one or more conditions, and the online system displays additional content items from the third party system to the user via the page maintained for the online system in response to receiving the message.

7System Architecture

Figure 1:
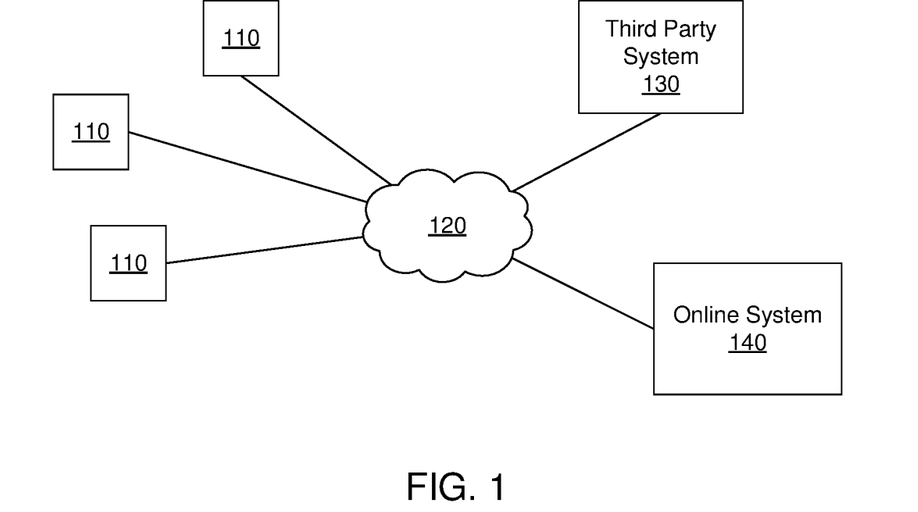
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 is a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

In various embodiments, the third party system 130 maintains content that is provided to one or more client devices 110 or to the online system 140 for display to users. Users may interact with the content maintained by the third party system 130, which receives the interactions. The third party system 130 may store the interactions by users with the content in association with information identifying the user. As further described below in conjunction with FIG. 3, the third party system 130 also maintains one or more conditions to which interactions by one or more users with the content maintained by the third party system 130 are compared. In various embodiments, the one or more conditions identify different interactions or combination of interactions. For example, different conditions identify different tasks for a user to perform via content maintained by the third party system 130, with different tasks corresponding to different aspects of a learning or educational curriculum. Hence, the conditions maintained by the third party system 130 allow the third party system 130 to guide a user through learning different concepts for a particular subject (e.g., computer programming).

As further described below in conjunction with FIGS. 3 and 4, based on comparison of interactions by one or more users to the one or more conditions maintained by the third party system 130, the third party system 130 modifies content presented by a page of content maintained by the online system 140. For example, when interactions by a user with content maintained by the third party system 130 satisfy one or more conditions, the third party system 130 provides additional content items to the online system 140 for presentation via a page of content maintained by the online system 140 and associated with the third party system 130. For example, the third party system 130 transmits additional content items to the online system 140, which subsequently displays the additional content items via the page of content along with content items previously displayed via the page of content. Modification of content items displayed on a page of content displayed by the online system 140 based on user interaction with content maintained by the third party system 130 is further described below in conjunction with FIGS. 3 and 4.

Figure 2:
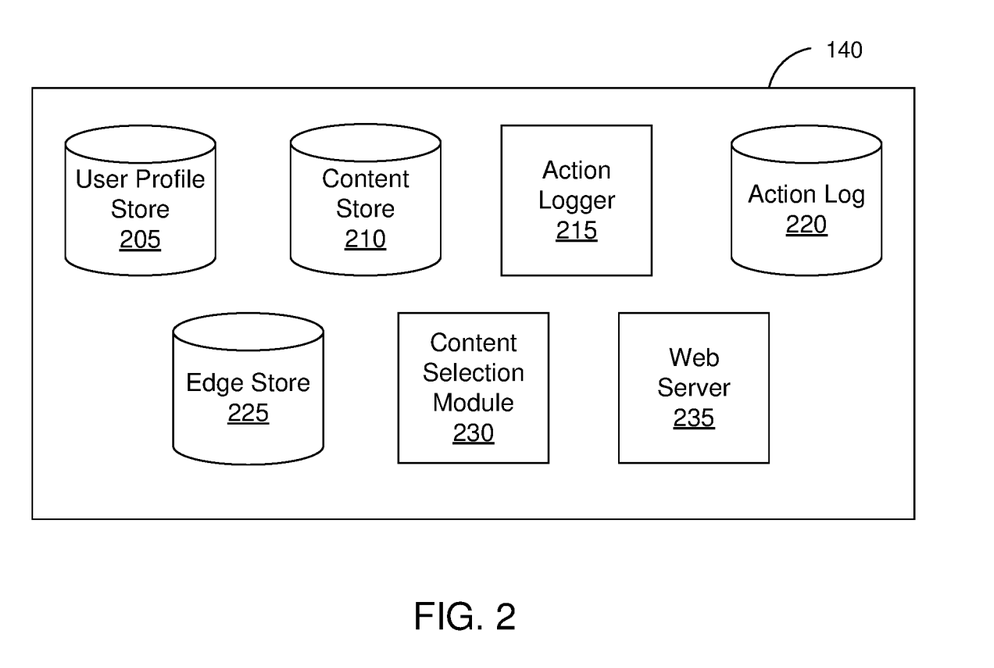
FIG. 2 is a block diagram of an online system, in accordance with an embodiment.

FIG. 2 is a block diagram of an architecture of the online system 140. The online system 140 shown in FIG. 2 includes a user profile store 205, a content store 210, an action logger 215, an action log 220, an edge store 225, a content selection module 230, and a web server 235. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

One or more content items included in the content store 210 are "sponsored content items" that include content for presentation to a user and a bid amount. The content is text, image, audio, video, or any other suitable data presented to a user. In various embodiments, the content also specifies a page of content. For example, a sponsored content item includes a landing page specifying a network address of a page of content to which a user is directed when the content item is accessed. The bid amount is included in a sponsored content item by a user and is used to determine an expected value, such as monetary compensation, provided by the user to the online system 140 if content in the sponsored content item is presented to a viewing user, if the content in the sponsored content item receives an interaction from the viewing user when presented, or if any suitable condition is satisfied when content in the sponsored content item is presented to a user. For example, the bid amount included in a sponsored content item specifies a monetary amount that the online system 140 receives from a user who provided the sponsored content item to the online system 140 if content in the sponsored content item is displayed. In some embodiments, the expected value to the online system 140 of presenting the content from the sponsored content item may be determined by multiplying the bid amount by a probability of the content of the content item being accessed by a user.

In various embodiments, a content item includes various components capable of being identified and retrieved by the online system 140. Example components of a content item include: a title, text data, image data, audio data, video data, a landing page, a user associated with the content item, or any other suitable information. The online system 140 may retrieve one or more specific components of a content item for presentation in some embodiments. For example, the online system 140 may identify a title and an image from a content item and provide the title and the image for presentation rather than the content item in its entirety.

Various content items, such as sponsored content items, may include an objective identifying an interaction that a user associated with a content item desires other users to perform when presented with content included in the content item. Example objectives include: installing an application associated with a content item, indicating a preference for a content item, sharing a content item with other users, interacting with an object associated with a content item, or performing any other suitable interaction. As content from a content item is presented to online system users, the online system 140 logs interactions between users presented with the content item or with objects associated with the content item. One or more objectives may identify a specific interaction with a landing page to which a content item, such as a sponsored content item, includes a link. Example specific interactions with the landing page include: establishing a connection to the landing page via the online system 140, transmitting a message to the publishing user through the online system via a link included on the landing page, indicating a preference for one or more content items included on the landing page, selecting a link to a web site in a different domain than the online system 140 included on the landing page, selecting a link on the landing page to establish a telephone call to the publishing user, purchasing one or more products via the landing page, selecting a link on the landing page to obtain directions to a physical location associated with the publishing user, selecting a link on the landing page to transmit an electronic mail message to the publishing user, and any combination thereof. Additionally, the online system 140 receives compensation from a user associated with content item as online system users perform interactions with a content item that satisfy the objective included in the content item.

Additionally, a content item, such as a sponsored content item, may include one or more targeting criteria specified by the user who provided the content item to the online system 140. Targeting criteria included in a content item request specify one or more characteristics of users eligible to be presented with the content item. For example, targeting criteria are used to identify users having user profile information, edges, or actions satisfying at least one of the targeting criteria. Hence, targeting criteria allow a user to identify users having specific characteristics, simplifying subsequent distribution of content to different users.

In various embodiments, the content store 210 includes multiple campaigns, which each include one or more content items. In various embodiments, a campaign in associated with one or more characteristics that are attributed to each content item of the campaign. For example, a bid amount associated with a campaign is associated with each content item of the campaign. Similarly, an objective associated with a campaign is associated with each content item of the campaign. In various embodiments, a user providing content items to the online system 140 provides the online system 140 with various campaigns each including content items having different characteristics (e.g., associated with different content, including different types of content for presentation), and the campaigns are stored in the content store.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sent a message to another user, used an application, joined a group, left a group, joined an event, generated an event description, purchased or reviewed a product or service using an online marketplace, requested information from a third party system 130, installed an application, or performed any other suitable action. Including actions in targeting criteria allows users to further refine users eligible to be presented with content items. As another example, targeting criteria identifies users having a connection to another user or object or having a particular type of connection to another user or object.

Additionally, in various embodiments, the content store 210 includes one or more content reels, with each content reel including one or more content items. A content reel includes one or more content items and an order in which the content items are displayed when the content reel is displayed. A user selects content items for inclusion in a content reel, and the content store 210 stores an identifier of content reel in association with an identifier of the user and with identifiers of content items included in the content reel, and the order in which the content items are to be displayed. In various embodiments, content items are included in a content reel for a specific amount of time, and a content item is removed from the content reel after the specific amount of time from the inclusion of the content item in the content reel. For example, the online system 140 removes an association between an identifier of a content item and an identifier of a content reel 24 hours after a time when the content item was included in the content reel by a user associated with the content reel.

Additionally, the content store 210 maintains pages of content associated with various users. A page of content is associated with a user and includes content items the online system 140 received from the user for display to other users to whom the page of content is displayed. Additionally, a user associated with a page of content may specify one or more links for inclusion on the page of content. Selection of a link by a user viewing the page of content causes the online system 140 to perform one or more actions corresponding to the link. As further described below in conjunction with FIG. 4, the user associated with the page of content selects one or more links to include on the page of content, allowing the user to customize interactions by other users with the page of content to increase engagement with the page of content or with the user associated with the page of content.

The action logger 215 receives communications about user actions (or "interactions") internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a reaction to an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content selection module 230 selects one or more content items for communication to a client device 110 to be presented to a user. Content items eligible for presentation to the user are retrieved from the content store 210 or from another source by the content selection module 230, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 230 includes content items eligible for presentation to the user in one or more selection processes, which identify a set of content items for presentation to the user. For example, the content selection module 230 determines measures of relevance of various content items to the user based on characteristics associated with the user by the online system 140 and based on the user's affinity for different content items. In some embodiments, when determining a measure of relevance of a content item to a user, the content selection module 230 determines a likelihood of the user performing a specific interaction with a page of content to which the content item includes a link after being presented with the content item (e.g., within a threshold amount of time of the content item being presented to the user); in various embodiments, the specific interaction is associated with the content item by a publishing user from whom the online system 140 obtained the content item. Based on the measures of relevance, the content selection module 230 selects content items for presentation to the user. As an additional example, the content selection module 230 selects content items having the highest measures of relevance or having at least a threshold measure of relevance for presentation to the user. Alternatively, the content selection module 230 ranks content items based on their associated measures of relevance and selects content items having the highest positions in the ranking or having at least a threshold position in the ranking for presentation to the user.

Content items eligible for presentation to the user may include content items associated with bid amounts. The content selection module 230 uses the bid amounts associated with content items when selecting content for presentation to the user. In various embodiments, the content selection module 230 determines an expected value associated with various content items based on their bid amounts and selects content items associated with a maximum expected value or associated with at least a threshold expected value for presentation. An expected value associated with a content item represents an expected amount of compensation to the online system 140 for presenting the content item. For example, the expected value associated with a content item is a product of the content item's bid amount and a likelihood of the user interacting with the content item. In various embodiments, the expected value associated with a content item is a product of a bid amount included in the content item and a likelihood of the user performing a specific interaction with a landing page to which the content item includes a link after the content item is displayed to the user. The specific interaction with the landing page is specified by a publishing user from whom the online system 140 obtained the content item in various embodiments. The content selection module 230 may rank content items based on their associated bid amounts and select content items having at least a threshold position in the ranking for presentation to the user. In some embodiments, the content selection module 230 ranks both content items not associated with bid amounts and content items associated with bid amounts in a unified ranking based on bid amounts and measures of relevance associated with content items. Based on the unified ranking, the content selection module 230 selects content for presentation to the user. Selecting content items associated with bid amounts and content items not associated with bid amounts through a unified ranking is further described in U.S. patent application Ser. No. 13/545,266, filed on Jul. 10, 2012, which is hereby incorporated by reference in its entirety.

For example, the content selection module 230 receives a request to present a feed of content to a user of the online system 140. The feed may include one or more content items associated with bid amounts and other content items, such as stories describing actions associated with other online system users connected to the user, which are not associated with bid amounts. The content selection module 230 accesses one or more of the user profile store 205, the content store 210, the action log 220, and the edge store 225 to retrieve information about the user. For example, information describing actions associated with other users connected to the user or other data associated with users connected to the user are retrieved. Content items from the content store 210 are retrieved and analyzed by the content selection module 230 to identify candidate content items eligible for presentation to the user. For example, content items associated with users who not connected to the user or stories associated with users for whom the user has less than a threshold affinity are discarded as candidate content items. Based on various criteria, the content selection module 230 selects one or more of the content items identified as candidate content items for presentation to the identified user. The selected content items are included in a feed of content that is presented to the user. For example, the feed of content includes at least a threshold number of content items describing actions associated with users connected to the user via the online system 140.

In various embodiments, the content selection module 230 presents content to a user through a newsfeed including a plurality of content items selected for presentation to the user. One or more content items may also be included in the feed. The content selection module 230 may also determine the order in which selected content items are presented via the feed. For example, the content selection module 230 orders content items in the feed based on likelihoods of the user interacting with various content items.

Additionally, the content selection module 230 retrieves a page of content associated with a user in response to receiving a request from a viewing user to view the page of content. The page of content includes one or more content items stored in the content store 210 in association with the user and displays the content items in a sequence or an order specified by the user from whom the content items were obtained. As further described below in conjunction with FIGS. 3 and 4, when a user associated with a page of content is also associated with a third party system 130, the online system 140 modifies content items presented by the page of content in response to information from the third party system 130. For example, the online system 140 receives a request from the third party system 130 including additional content items in response to the third party system 130 determining that interactions with content maintained by the third party system 130 satisfy one or more conditions maintained by the third party system 130. In another example, the online system 140 retrieves a request from the third party system 130 identifying one or more content items stored in the content store 210 from the third party system 130 in response to the third party system 130 determining that interactions with content maintained by the third party system 130 satisfy one or more conditions maintained by the third party system 130 and displays the identified one or more content items via the page of content. Modification of content items displayed by a page of content in response to a user, or users, performing interactions with content maintained by the third party system is further described below in conjunction with FIGS. 3 and 4.

The web server 235 links the online system 140 via the network 120 to the one or more client devices 110, as well as to the one or more third party systems 130. The web server 235 serves web pages, as well as other content, such as JAVA®, FLASH®, XML and so forth. The web server 235 may receive and route messages between the online system 140 and the client device 110, for example, instant messages, queued messages (e.g., email), text messages, short message service (SMS) messages, or messages sent using any other suitable messaging technique. A user may send a request to the web server 235 to upload information (e.g., images or videos) that are stored in the content store 210. Additionally, the web server 235 may provide application programming interface (API) functionality to send data directly to native client device operating systems, such as IOS®, ANDROID™, or BlackberryOS.

Figure 3:
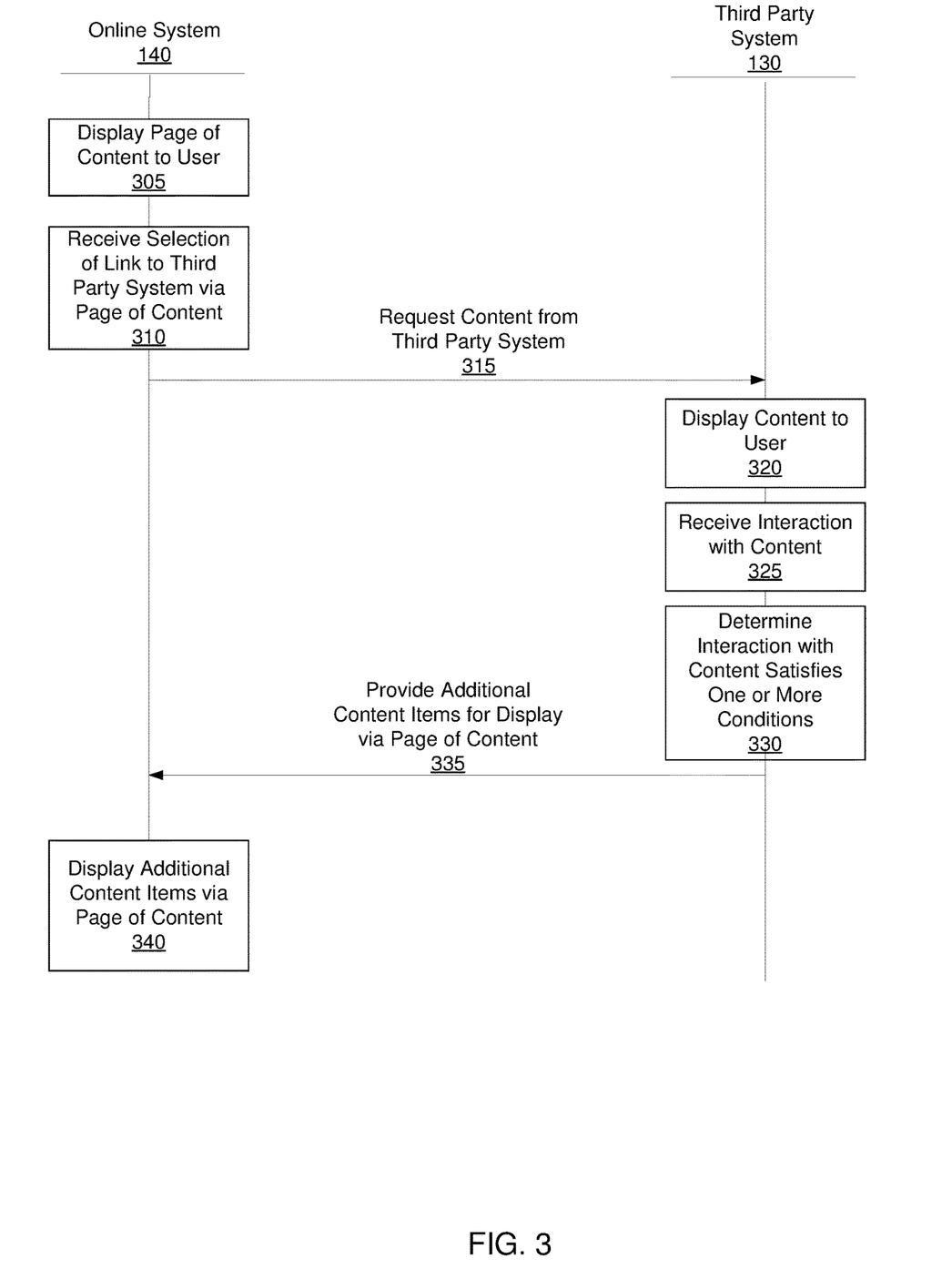
FIG. 3 is an interaction diagram of a method for an online system modifying content items displayed by a page of content based on user interactions with content maintained by a separate third party system, in accordance with an embodiment.

Modifying Content Items Presented by a Page of Content Based on Interactions with Content Maintained by a Third Party System FIG. 3 is an interaction diagram of one embodiment of a method for an online system 140 modifying content items displayed by a page of content based on user interactions with content maintained by a separate third party system 130. In various embodiments, the method may include different or additional steps than those described in conjunction with FIG. 3. Additionally, in some embodiments, the method may perform the steps in different orders than the order described in conjunction with FIG. 3.

An online system 140 obtains content items from various users and maintains pages of content for different users. A page of content maintained for a user includes one or more content items the online system 140 obtained from users and displays the content items to other users who access the page of content. The user associated with the page of content may specify an order or an arrangement in which the page of content. For example, the user may specify an arrangement of content items on the page of content so multiple content items, when displayed on the page of content, form an image or a map. In some embodiments, the user associated with a page of content is a third party system 130 that is in a domain different than a domain of the online system 140 (i.e., a third party system 130 "external to" the online system 140) or is associated with the third party system 130 external to the online system 140. The online system 140 displays 305 the page of content to one or more viewing users. For example, the online system 140 transmits the page of content to various client devices 110, which display 305 the page of content to viewing users.

One or more of the content items included in the page of content may include links that, when selected by a user, retrieve an additional page of content maintained by the online system 140 For example, when a user selects a content item from the page of content, the content item is increased in size or otherwise visually distinguished from other content items on the page of content. When the user subsequently selects or clicks on the enlarged or otherwise visually distinguished content item, one or more links are overlaid on the content item. For example, a link identifies an additional user of the online system 140, and selection of the link by the user via a client device 110 retrieves an additional page of content associated with the additional user and displays the additional page of content via the client device 110. As another example, a link identifies content maintained by the third party system 130 external to the online system; in the preceding example, when the user selects the link via a client device 110, the client device 110 retrieves the content from the third party system 130 and displays the content from the third party system 130. Hence, the user associated with the page of content may identify additional pages of content or content maintained by a third party system 130 related to, or otherwise relevant to, content items included on the page of content and allow users to readily access the other pages of content or content maintained by the third party system 130.

Additionally, the page of content includes a link to the third party system 130 that, when selected or accessed by a user, obtains content from the third party system 130. For example, the page of content includes the link in a region of the page of content separate from the content items. As an example, the page of content includes a region identifying the user, such as a username of the user and other identifying information, and the link to the third party system 130 is included in the region identifying the user. When the online system 140 receives 310 a selection of the link to the third party system 130 from a client device 110 of a viewing user, the online system 140 requests 315 content from the third party system 130, and transmits the content from the third party system 130 to the client device 110 of the viewing user. In some embodiments, when requesting 315 content from the third party system 130, the online system 140 includes information identifying the viewing user in a request transmitted to the third party system 130. For example, the online system 140 includes a user identifier of the viewing user maintained by the online system 140 in the request. Hence, selecting the link included in the page of content allows the viewing user to retrieve content from the third party system 130 that is displayed to the viewing user via a client device 110.

In response to the request from the online system 140, the third party system 130 displays 320 content corresponding to the selected link to the viewing user. In various embodiments, the third party system 130 retrieves a web page corresponding to the link included in the page of content and transmits the web page to a client device 110 associated with the viewing user for display 320. Via the client device 110, the viewing user interacts with the content maintained by the third party system 130, and the third party system 130 receives 325 the interactions by the viewing user with the content maintained by the third party system 130. For example, the client device 110 transmits different interactions by the viewing user to the third party system 130 along with information identifying the viewing user. In some embodiments, the third party system 130 receives 325 interactions by the viewing user with the content maintained by the third party system 130 along with the user identifier of the viewing user maintained by the online system 140. Alternatively, the third party system 130 maintains the identifier of the viewing user maintained by the online system 140 in association with an identifier of the client device 110 associated with the viewing user or with an identifier of an application executing on the client device 110 and used to display 320 the content maintained by the third party system 130.

Based on interactions by the viewing user with the content maintained by the third party system 130, the third party system 130 determines 330 whether interactions with the content maintained by the third party system 130 satisfies one or more conditions maintained by the third party system 130. For example, the third party system 130 maintains a total number of interactions with the content maintained by the third party system 130 by the viewing user. Alternatively, the third party system 130 maintains an aggregated number of interactions with the content maintained by the third party system 130 by multiple users. In other embodiments, different conditions specify tasks that include different combinations of interactions with the content maintained by the third party system 130. For example, a task identifies a sequence of specific interactions to perform with content maintained by the third party system 130. In some embodiments, different tasks correspond to different educational goals for the viewing user regarding a subject. For example, different tasks identify different sequences of interactions describing computer programming techniques or concepts, so the viewing user learns different computer programming techniques when the viewing user's interactions with the content maintained by the third party system 130 satisfy different conditions. However, in other embodiments, tasks correspond to sequences or combinations of interactions that correspond to the viewing user learning different concepts in any suitable field or endeavor.

In some embodiments, the content items displayed on the page of content, as well as other information displayed on the page of content include subject matter describing concepts or background of different concepts (e.g., computer programming techniques). This allows the page of content to provide educational material to users about one or more subjects or topics based on content items included on the page of content and an order or a sequence in which the content items are presented on the page of content. When the viewing user selects the link included on the page of content, content maintained by the third party system 130 is displayed, as further described above. The content maintained by the third party system 130 is related to or is otherwise associated with the subject or topics described by the content items on the page of content. The third party system 130 maintains different conditions specify tasks that include different combinations of interactions with the content maintained by the third party system 130. For example, a task identifies a sequence of specific interactions to perform with content maintained by the third party system 130, allowing the task to identify one or more interactions with the content maintained by the third party system 130 that are related to the subject matter described by the content items on the page of content. In some embodiments, different tasks correspond to different educational goals for the viewing user regarding one or more subjects about which content items on the page of content provide information. For example, different tasks are questions relating to concepts or subjects described by one or more content items on the page of content, so the tasks confirm the viewing user's knowledge of material presented by the page of content.

To determine 325 whether interactions by the viewing user with the content maintained by the third party system 130 satisfy one or more conditions, the third party system 130 compares received interactions with the content maintained by the third party system 130 to the one or more conditions maintained by the third party system 130. For example, the third party system 130 determines 325 the viewing user's interactions with the content maintained by the third party system 130 satisfy a condition if a total number of interactions with the viewing user with the content maintained by the third party system 130 equals or exceeds a threshold number. In another example, the third party system 130 determines 325 the viewing user's interactions with the content maintained by the third party system 130 satisfy a condition if an aggregated number of interactions by the viewing user and by other users with the content maintained by the third party system 130 equals or exceeds a threshold number. If the third party system 130 maintains conditions corresponding to different tasks, the third party system 130 determines 325 the viewing user's interactions satisfy a condition in response to one or more interactions by the viewing user with the content maintained by the viewing user satisfying a task identified by the condition.

In response to determining that interactions by the viewing user with the content maintained by the third party system 130 satisfy one or more conditions maintained by the third party system 130, the third party system 130 provides 335 additional content items to the online system 140 for display by the page of content. For example, the third party system 130 transmits additional content items to the online system 140, which displays the additional content items on the page of content in conjunction with content items already included on the page of content. In another example, the third party system 130 transmits a message to the online system 140 identifying content items the online system previously received from the third party system 130, and the online system 140 subsequently displays 340 the content items identified by the message via the page of content along with content items already displayed on the page of content in response to receiving the message. In some embodiments, the online system 140 limits display 340 of the additional content items via the page of content to the viewing user because the viewing user's interactions with content maintained by the third party system 130 satisfied one or more conditions maintained by the third party system 130, while preventing display of the additional content items via the page of content to other users who have not performed interactions with the content maintained by the third party system 130 satisfying one or more conditions maintained by the third party system 130. Alternatively, the online system 140 displays 340 the additional content items via the page of content to users who access the page of content after the third party system 130 determines 330 that interactions with the content maintained by the third party system 130 by the viewing user, or by other users, satisfy the one or more conditions. This allows the third party system 130 to condition display of additional content items to users via the page of content on user interactions with the content maintained by the third party system 130 satisfying one or more conditions. This display of additional content via the page of content allows the third party system 130 and the online system 140 to entice users to interact with the content maintained by the third party system 130 to enhance presentation of content to the users' via the online system 140. When one or more conditions maintained by the third party system 130 correspond to tasks, the method described above allows the third party system 130 to direct users to perform various tasks, such as tasks corresponding to different concepts in a curriculum for a specific subject, by making additional content items available to the users via the page of content maintained by the online system 140 when different tasks are satisfied by user interaction with content maintained by the third party system 130.

Figure 4:
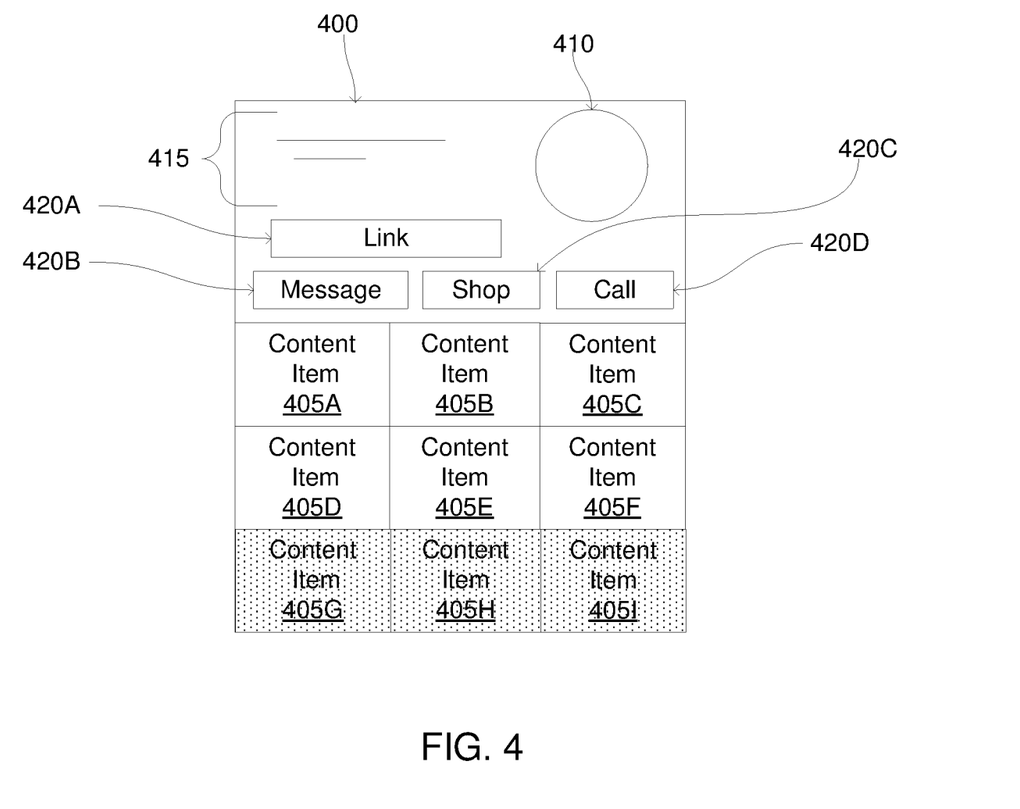
FIG. 4 is an example page of content that is modified based on user interactions with content maintained by a third party system, in accordance with an embodiment.

FIG. 4 shows an example page of content 400 maintained by the online system 140 that is modified based on user interactions with content maintained by a third party system 130. In the example shown by FIG. 4, the page of content 400 includes content items 405A-405F (also referred to individually and collectively using reference number 405) provided to the online system 140 by a publishing user for presentation to other users. While FIG. 4 shows an example where the content items 405A-405F are displayed in a grid format having multiple rows that each include three content items 405, in other embodiments, the page of content 400 may display the content items 405 in other formats. For example, in an alternative embodiment, the page of content 400 includes multiple rows of content items 405, with each row including a single content item 405. In various embodiments, the user specifies a sequence or an order in which the content items 405 are presented by the page of content 400, allowing the user to organize content items 405A-F on the page of content 400 to display a composite image, such as a map or another image.

Additionally, the page of content 400 included in FIG. 4 displays an image 410 of the publishing user and a username 415 of the publishing user. In some embodiments, text data provided by the publishing user is displayed along with the username 415 of the publishing user via the page of content 400. The page of content 400 also includes a link 420A that identifies content maintained by a third party system 130 that is in a domain different than a domain of the online system 140. For example, the link 420A is a network address of a web page maintained by the third party system 130. When a user to whom the page of content 400 is displayed selects the link 420A, the web page is retrieved from the third party system 130 and displayed to users.

In the example shown by FIG. 4, content items 405G-405I are nod displayed to a user when the page of content 400 is initially displayed to a user. Content items 405G-405I are displayed to the user when a third party system 130 from which content is retrieved via the link 420A transmits an indication to the online system 140 that interactions by users with content maintained by the third party system 130 satisfy one or more conditions maintained by the third party system 130. For example, the third party system 130 transmits content items 405G-405I to the online system 140 after determining that interactions with content maintained by the third party system 130 by the user, or by multiple users, satisfy one or more conditions. Alternatively, the online system 140 stores content items 405G-405I, but does not display content items 405G-405I until receiving a message from the third party system 130 that interactions with content maintained by the third party system 130 by the user, or by multiple users, satisfy one or more conditions and that identifies content items 405G-405I. Thus, the third party system 130 modifies content items 405 displayed by the page of content 400 in response to a user or multiple users having performed interactions with content maintained by the online system 140 that satisfy one or more conditions maintained by the online system 140, so that interactions with the third party system 130 cause additional content items 405 to be displayed by the page of content 400. This allows the third party system 130 to maintain conditions for interactions with content presented by the third party system 130 and to communicate a notification or additional content items to the online system 140, which is external to and distinct from the third party system 130, for the online system 140 to display to the user via the page of content 400. Hence, the third party system 130 may alter content items 405 that the online system 140 presents to the user based on how the user interacts with content presented by the third party system 130, allowing the third party system 130 to regulate how the online system 140 allocates display space on the page of content 400 to a user based on how the user interacts with content provided by the third party system 130. When a user access the page of content 400 via a client device 110 with limited display area, such as a mobile device, this allows the third party system 130 to more efficiently use the limited display area to display content to the user that accounts for the user's interactions with content displayed by the third party system 130 to the user.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but

What is claimed is:

1. A method comprising:
   displaying, by an online system, a page of content for a third party system external to the online system that includes one or more content items for display in an order specified by the third party system, one or more or more of the content items each including a link to content from the third party system external to the online system;
   receiving, at the online system, a selection of a link to content from the third party system external to the online system from a viewing user viewing the page of content, the link included in a content item displayed by the page;
   transmitting a request from the online system to the third party system external to the online system for content from the third party system corresponding to the selected link, the request including a user identifier of the viewing user maintained by the online system;
   receiving, at the online system, one or more additional content items from the third party system in response to the third party system determining interactions by the viewing user with the content from the third party system corresponding to the selected link satisfy one or more conditions maintained by the third party system; and
   displaying the one or more additional content items from the third party system to the viewing user via the page of content,
   wherein receiving, at the online system, one or more additional content items from the third party system comprises:
      receiving, at the online system, a message from the third party system in response to the third party system determining interactions by the viewing user with the content from the third party system corresponding to the selected link satisfy one or more conditions maintained by the third party system, the message identifying one or more content items the third party system previously provided to the online system for display,
wherein the one or more conditions maintained by the third party system comprise a task including a combination of interactions with the content, wherein the task identifies a sequence of specific interactions to perform with the content maintained by the third party system.

2. The method of claim 1, wherein displaying the one or more additional content items from the third party system to the viewing user via the page of content comprises:
displaying the one or more additional content items from the third party system via the page of content in conjunction with one or more content items already displayed on the page of content.

3. The method of claim 1, wherein displaying the one or more additional content items from the third party system to the viewing user via the page of content comprises:
displaying the one or more additional content items from the third party system to the viewing user via the page of content while preventing the display of the one or more additional content items from the third party system to another user for whom the third party system determined interactions by the other user with the content from the third party system corresponding to the selected link did not satisfy the one or more conditions maintained by the third party system.

4. The method of claim 1, wherein displaying the one or more additional content items from the third party system to the viewing user via the page of content comprises:
displaying the one or more additional content items from the third party system to the viewing user via the page of content and displaying the one or more additional content items from the third party system to another user accessing the page of content at a time after the third party system determined interactions by the viewing user with the content from the third party system corresponding to the selected link satisfied the one or more conditions maintained by the third party system.

5. The method of claim 1, wherein the one or more conditions maintained by the third party system include a total number of interactions with the content maintained by the third party system by the viewing user.

6. The method of claim 1, wherein the one or more conditions maintained by the third party system include an aggregate number of interactions with the content maintained by the third party system by the viewing user and one or more other users of the online system.

7. The method of claim 1, wherein the one or more conditions maintained by the third party system includes a task including a combination of interactions with the content maintained by the third party system.

8. A method comprising:
maintaining, at a third party system, conditions for interaction by a user with content maintained by the third party system, wherein the one or more conditions for interaction by the user with the content maintained by the third party system comprise a task including a combination of interactions with the content maintained by the third party system, wherein the task identifies a sequence of specific interactions to perform with the content maintained by the third party system;
receiving a request for content maintained by the third party system from an online system external to the third party system, the request including an identifier of a viewing user of the online system viewing a page of content maintained by the online system for the third party system;
displaying the content corresponding to the request to the viewing user by the third party system;
receiving, at the third party system, one or more interactions by the viewing user with the content corresponding to the request; and
responsive to the third party system determining the received one or more interactions by the viewing user with the content corresponding to the request satisfy one or more conditions maintained by the third party system, transmitting a message including one or more additional content items from the third party system to the online system for display via the page of content maintained by the online system for the third party system.

9. The method of claim 8, wherein the one or more conditions for interaction by the user with content maintained by the third party system comprises a total number of interactions with the content maintained by the third party system by the user.

10. The method of claim 8, wherein the one or more conditions for interaction by the user with content maintained by the third party system comprises an aggregate number of interactions with the content maintained by the third party system by the user and one or more other users of the online system.

11. The method of claim 8, wherein transmitting the message including one or more additional content items from the third party system to the online system for display via the page of content maintained by the online system for the third party system comprises:
transmitting a message to the online system identifying one or more content items the third party system previously provided to the online system for display via the page of content maintained by the online system for the third party system.

12. The method of claim 8, wherein the one or more additional content items are displayed to the viewing user via the page of content maintained by the online system for the third party system and are withheld from display to other users for whom the third party system has not determined that received one or more interactions by the one or more other users user with the content corresponding to the request satisfy one or more conditions maintained by the third party system.

13. The method of claim 8, wherein the one or more additional content items are displayed via the page of content maintained by the online system for the third party system to the viewing user and are displayed to other users accessing the page of content maintained by the online system for the third party system after the third party system determined the received one or more interactions by the viewing user with the content corresponding to the request satisfy one or more conditions maintained by the third party system.

14. A computer program product comprising a non-transitory computer readable storage medium having instructions encoded thereon that, when executed by a processor, cause the processor to:
display, by an online system, a page of content for a third party system external to the online system that includes one or more content items for display in an order specified by the third party system, one or more or more of the content items each including a link to content from the third party system external to the online system;

receive, at the online system, a selection of a link to content from the third party system external to the online system from a viewing user viewing the page of content, the link included in a content item displayed by the page;

transmit a request from the online system to the third party system external to the online system for content from the third party system corresponding to the selected link, the request including a user identifier of the viewing user maintained by the online system;

receive, at the online system, one or more additional content items from the third party system in response to the third party system determining interactions by the viewing user with the content from the third party system corresponding to the selected link satisfy one or more conditions maintained by the third party system; and display the one or more additional content items from the third party system to the viewing user via the page of content, wherein receive, at the online system, one or more additional content items from the third party system comprises:

receive, at the online system, a message from the third party system in response to the third party system determining interactions by the viewing user with the content from the third party system corresponding to the selected link satisfy one or more conditions maintained by the third party system, the message identifying one or more content items the third party system previously provided to the online system for display, wherein the one or more conditions maintained by the third party system comprise a task including a combination of interactions with the content, wherein the task identifies a sequence of specific interactions to perform with the content maintained by the third party system.

* * * * *

UNITED STATES PATENT AND TRADEMARK OFFICE
CERTIFICATE OF CORRECTION

PATENT NO. : 11,086,488 B1  
APPLICATION NO. : 16/997143  
DATED : August 10, 2021  
INVENTOR(S) : Addie Louise Marino Page 1 of 1

It is certified that error appears in the above-identified patent and that said Letters Patent is hereby corrected as shown below:

In the Claims

In Column 18, Claim 1, Lines 37-38, delete "one or more or more of" and insert -- one or more of --, therefor.

In Column 20, Claim 12, Line 47, delete "users user" and insert -- users --, therefor.

In Column 20, Claim 14, Line 67, delete "one or more or more" and insert -- one or more --, therefor.

Signed and Sealed this  
Twenty-second Day of March, 2022

Drew Hirshfeld  
*Performing the Functions and Duties of the*  
*Under Secretary of Commerce for Intellectual Property and*  
*Director of the United States Patent and Trademark Office*